United States Patent
Reilly et al.

(10) Patent No.: US 8,971,535 B2
(45) Date of Patent: Mar. 3, 2015

(54) MULTI-LEVEL KEY MANAGEMENT

(75) Inventors: Paul A. Reilly, Nashua, NH (US); Chet Birger, Lexington, MA (US); Denis Knjazihhin, Brighton, MA (US)

(73) Assignee: Bladelogic, Inc., Houston, TX (US)

( * ) Notice: Subject to any disclaimer, the term of this patent is extended or adjusted under 35 U.S.C. 154(b) by 950 days.

(21) Appl. No.: 12/788,890

(22) Filed: May 27, 2010

(65) Prior Publication Data

US 2011/0293096 A1    Dec. 1, 2011

(51) Int. Cl.
*H04L 9/00* (2006.01)
*H04L 9/16* (2006.01)
*H04L 9/08* (2006.01)

(52) U.S. Cl.
CPC ............... *H04L 9/16* (2013.01); *H04L 9/0833* (2013.01); *H04L 9/088* (2013.01); *H04L 9/0894* (2013.01)
USPC .............. 380/277; 380/44; 380/278; 703/150

(58) Field of Classification Search
CPC ....... H04L 9/08; H04L 9/0802; H04L 9/0805; H04L 9/30
USPC ............ 380/44, 277, 278; 713/150, 164, 168, 713/176
See application file for complete search history.

(56) References Cited

U.S. PATENT DOCUMENTS

| | | | | |
|---|---|---|---|---|
| 5,224,166 A | * | 6/1993 | Hartman, Jr. | 713/190 |
| 5,812,666 A | * | 9/1998 | Baker et al. | 380/277 |
| 6,044,155 A | * | 3/2000 | Thomlinson et al. | 713/155 |
| 6,144,744 A | * | 11/2000 | Smith et al. | 380/45 |
| 6,389,534 B1 | * | 5/2002 | Elgamal et al. | 713/164 |
| RE38,070 E | * | 4/2003 | Spies et al. | 380/277 |
| 6,901,512 B2 | * | 5/2005 | Kurn et al. | 713/164 |
| 6,978,367 B1 | * | 12/2005 | Hind et al. | 713/167 |
| 7,181,016 B2 | * | 2/2007 | Cross et al. | 380/281 |
| 7,328,344 B2 | * | 2/2008 | Chang | 713/175 |
| 7,360,241 B1 | * | 4/2008 | Elgamal et al. | 726/11 |
| 7,996,322 B2 | * | 8/2011 | You et al. | 705/56 |
| 8,165,304 B2 | * | 4/2012 | Choi et al. | 380/277 |
| 2001/0042124 A1 | * | 11/2001 | Barron | 709/227 |
| 2007/0180497 A1 | * | 8/2007 | Popescu et al. | 726/4 |
| 2009/0208016 A1 | * | 8/2009 | Choi et al. | 380/277 |

OTHER PUBLICATIONS

Salowey, J., L. Dondeti, V. Narayanan, and M. Nakhjiri. "Specification for the derivation of root keys from an Extended Master Session Key (EMSK)." draft-ietf-hokey-emsk-hierarchy-01 (work in progress) (2007).*

(Continued)

*Primary Examiner* — Saleh Najjar
*Assistant Examiner* — Peiliang Pan

(57) ABSTRACT

A key manager provides a way to separate out the management of encryption keys and policies from application domains. The key manager may create cipher objects that may be used by the domains to perform encryption or decryption, without exposing the keys or encryption/decryption algorithms to the domains. A master key managed by the key manager may be used to encrypt and decrypt the domain keys that are stored under the control of the key manager. The key manager supports the rekeying of both the master key and the domain keys based on policy. Multiple versions of domain keys may be supported, allowing domains to access data encrypted with a previous version of a domain key after a rekeying.

16 Claims, 10 Drawing Sheets

(56) References Cited

OTHER PUBLICATIONS

Horwitz, Jeremy, and Ben Lynn. "Toward hierarchical identity-based encryption." In Advances in Cryptology—EUROCRYPT 2002, pp. 466-481. Springer Berlin/Heidelberg, 2002.*

Ehrsam, William F., Stephen M. Matyas, Carl H. Meyer, and Walter L. Tuchman. "A cryptographic key management scheme for implementing the Data Encryption Standard." IBM Systems Journal 17, No. 2 (1978): 106-125.*

"HP StorageWorks Secure Key Manager" Data Sheet, © 2008 Hewlett-Packard Development Company, L.P., 4 pages.

"HP StorageWorks Secure Key Manager—Key Protection Best Practices", © 2008 Hewlett-Packard Development Company, L.P., 19 pages.

"RSA® Key Manager with Application Encryption" Product Data Sheet, © 2008-2009 RSA Security, Inc., 4 pages.

"RSA® Encryption and Key Management Suite" RSA Solution Brief, © 2008 RSA Security, Inc., 8 pages.

"Enterprise Key Management—Deploying a new generation of solutions for enterprise key management" White Paper, © 2009 RSA Security, Inc., 16 pages.

"Securing Data at Rest: Developing a Database Encryption Strategy" White Paper, © 2002 RSA Security, Inc., 15 pages.

"Design and Implementation for RSA® Key Manager with Application Encryption" Services Data Sheet, © 2007-2008 RSA Security, Inc., 2 pages.

Techworld, "Security: the protocol is the key", Chris Mellor, Techworld Oct. 30, 2007, www.techworld.com.

HP, "HP StorageWorks Secure Key Manager—Specifications", www.hp.com, printed Aug. 5, 2009.

RSA, "RSA Encryption and Key Management Suite", www.rsa.com, printed Aug. 5, 2009.

RSA, "RSA Key Manager with Application Encryption", www.rsa.com, printed Aug. 5, 2009.

NetApp, "NetApp Lifetime Key Management", www.netapp.com, printed Aug. 5, 2009.

NetApp, "NetApp DataFort Security Systems", www.netapp.com, printed Aug. 5, 2009.

"NetApp Lifetime Key Management—Improve access to encrypted data by simplifying key management", © 2008 NetApp., 2 pages.

"RSA ® Key Manager with Application Encryption" Solution Brief, © 2006-2008 RSA Security, Inc., 16 pages.

IBM, "Centralize and simplify encryption key management", www-01.ibm.com, printed Aug. 5, 2009.

"Beginning Cryptography with Java," David Hook, © 2005 by Wiley Publishing, Chapters 1 & 8, 50 pages.

* cited by examiner

MULTI-LEVEL KEY MANAGEMENT

BACKGROUND

This disclosure relates generally to the field of computer software. More particularly, but not by way of limitation, it relates to a method for managing encryption keys for computer software applications.

Complex distributed applications, specifically middle-tier applications, need to manage confidential information from multiple sources which is used for different purposes, including (a) database login usernames and passwords, (b) back end server credentials, (c) X.509 certificates, (d) application login names and passwords, (e) confidential application data, and (f) end user data.

One common technique for managing confidential information is the use of cryptography services that may encrypt and decrypt the information. Each type of information may have different requirements for secure storage and retrieval. These requirements may include (a) encryption algorithm, (b) length of the encryption key, (c) lifetime of the encryption key, (d) storage of the encrypted data, (e) and performance.

These different requirements lead to different solutions being chosen for each domain of data. Given that each domain use will require its own key or keys for encryption, this leads to each area requiring a separate process for securely storing and retrieving their keys, encrypting and decrypting the data, managing key cycling requirements, maintaining key versions, etc.

One example of an application 100 needing encryption according to the prior art is illustrated in FIG. 1. Application 100 has three domains 110, 120, and 130. Each application domain 110-120 independently manages its own application data, encryption algorithms, keys, and key management policies. Domain 110 may choose to have its encryption key 112 stored in a file, domain 120 may hard code its encryption key 122 into the application, and domain 130 may choose to store one key 132 in a database and may require that the password 133 be entered at application startup. Along with key storage, the other policies around key management typically are haphazard and without any controls. There is typically little or no coordination or enforcement of policies 114, 124, or 134. This leads to a less secure application and makes determining the overall security of the application and its data more difficult.

Separate key storage and management policies leads to issues with the overall security of the application and its data. If one domain chooses a weak strategy, then it may expose the data for other domains by exposing an easier point of attack. In addition, with each domain and its encryption keys, there are the associated issues of enforcing key management policies, such as using mandated encryption algorithms, key lengths, key storage, and key lifetime.

SUMMARY

In one embodiment, a method is disclosed. The method comprises managing a cryptography key associated with a software application by a key manager; and providing access by the software application to cryptography services and the cryptography key without exposing the cryptography keys or the cryptography services to the software application.

In another embodiment, a computer system is disclosed. The computer system comprises a processor; a keystore, coupled to the processor; a program store, coupled to the processor; a key manager software, stored in the program store, comprising instructions that when executed by the processor cause the processor to perform actions. The actions comprise encrypting and decrypting a cryptography key associated with a software application and stored in the keystore; and generating a cryptography services software. The cryptography services software comprises instructions that when executed by the processor cause the processor to perform actions. The actions comprise providing cryptography services to a software application using the cryptography key, without exposing the cryptography services or the cryptography key to the software application.

In yet another embodiment, a computer readable medium is disclosed. The computer readable medium stores instructions for a programmable control device, which when executed cause the programmable control device to perform the method described above.

In yet another embodiment, a networked computer system is disclosed. The networked computer system comprises an application computer, executing a first software that requests cryptography services; and a server computer, communicatively coupled to the application computer by a network, executing a second software that performs cryptography services as requested by the application computer. The second software comprises a key manager, configured to manage a cryptography key associated with the first software; and a cipher object, instantiated by the key manager, configured to perform cryptography services using the cryptography key without exposing the cryptography services or the cryptography key to the first software.

DETAILED DESCRIPTION

Figure 1:
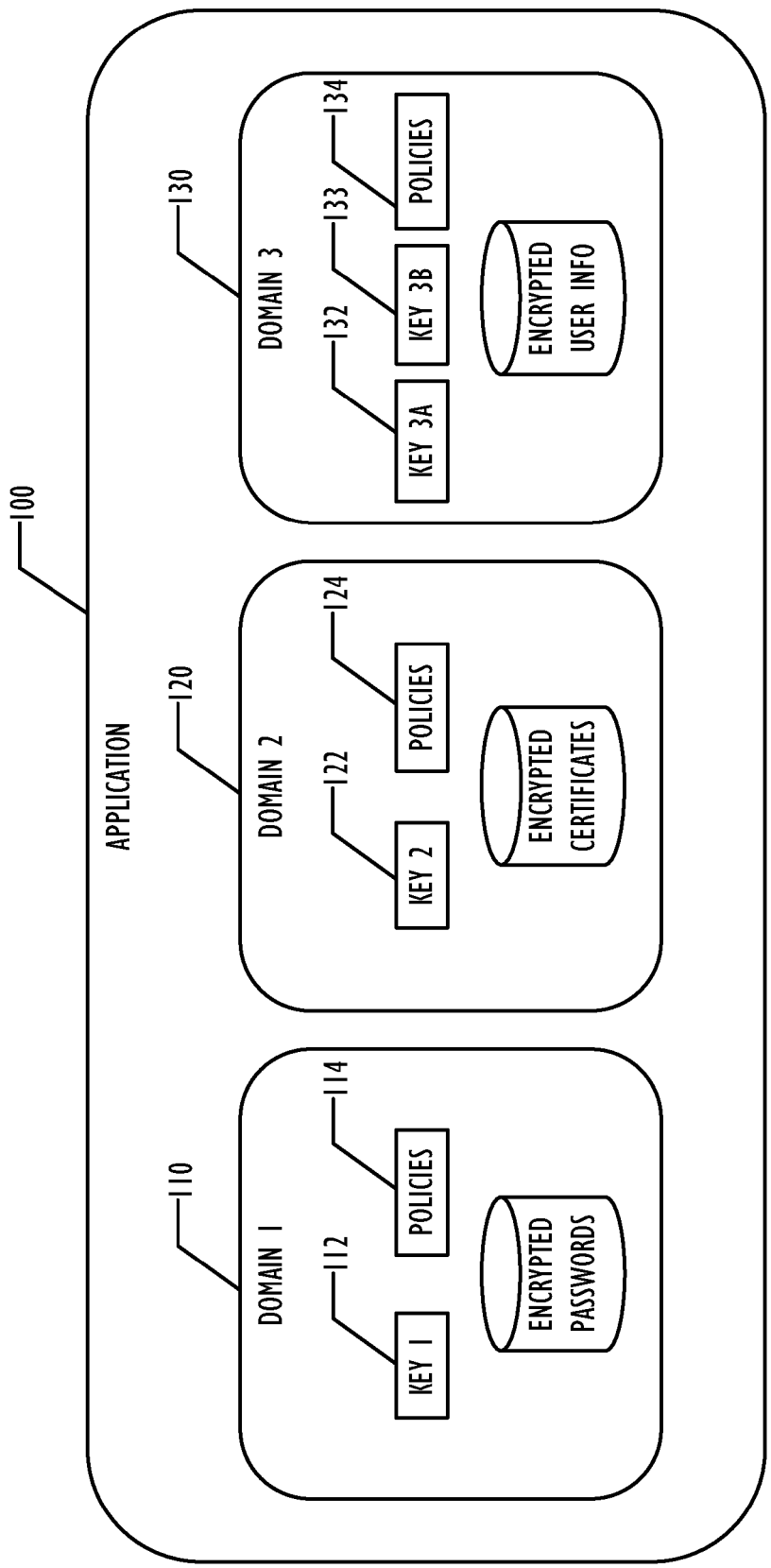
FIG. 1 illustrates, in block diagram form, an example of key management according to the prior art.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts or suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection the embodiments is included in at least one embodiment of the invention, and multiple references to "one embodiment" or "an embodiment" should not be understood as necessarily all referring to the same embodiment.

Although the following description is written in certain places in terms of a JAVA® environment, the scope of the present invention is not so limited, and the techniques described below may be used in other environments. ("JAVA" is a registered trademark of Sun Microsystems, Inc.) The following description is written in terms of object-oriented languages and environments, but the techniques described below are not limited to object-oriented languages and environments.

A fundamental concept and important building block of system security is the protection domain. A domain may be scoped by the set of objects that are currently directly accessible by a principal, where a principal is an entity in the computer system to which permissions (and as a result, accountability) are granted. The sandbox utilized in the JDK® 1.0 is one example of a protection domain with a fixed boundary. ("JDK" is a registered trademark of Sun Microsystems, Inc.)

The protection domain concept serves as a convenient mechanism for grouping and isolation between units of protection. For example, it may be possible to separate protection domains from interacting with each other so that any permitted interaction must be through trusted system code or explicitly allowed by the domains concerned.

Protection domains generally fall into two distinct categories: system domains and application domains. Protected external resources, such as the file system, the networking facility, and the screen and keyboard, are typically accessible only via system domains.

A domain conceptually encloses a set of classes whose instances are granted the same set of permissions. Protection domains are determined by the policy currently in effect. The JAVA application environment maintains a mapping from code (classes and instances) to their protection domains and then to their permissions.

A thread of execution (which is often, but not necessarily tied to, a single JAVA thread, which in turn is not necessarily tied to the thread concept of the underlying operation system) may occur completely within a single protection domain or may involve an application domain and also the system domain. For example, an application that prints a message out may have to interact with the system domain that is the only access point to an output stream.

Each domain (system or application) may also implement additional protection of its internal resources within its own domain boundary. For example, a banking application may need to support and protect internal concepts such as checking accounts, deposits, and withdrawals.

Embodiments of the present invention separate the key storage, policies, and management from the domain itself and incorporate those functions into a key manager. Centralizing the management and enforcement of these policies simplifies the process and allows for a single point for management across all of the domains. Any number of keys may be stored securely using one master key. The master key may be used to provide cryptographically strong protection for all of the domain keys. In one embodiment, domain symmetric keys are used to protect the end data. Other embodiments may use domain asymmetric keys, such as public key encryption techniques.

Figure 2:
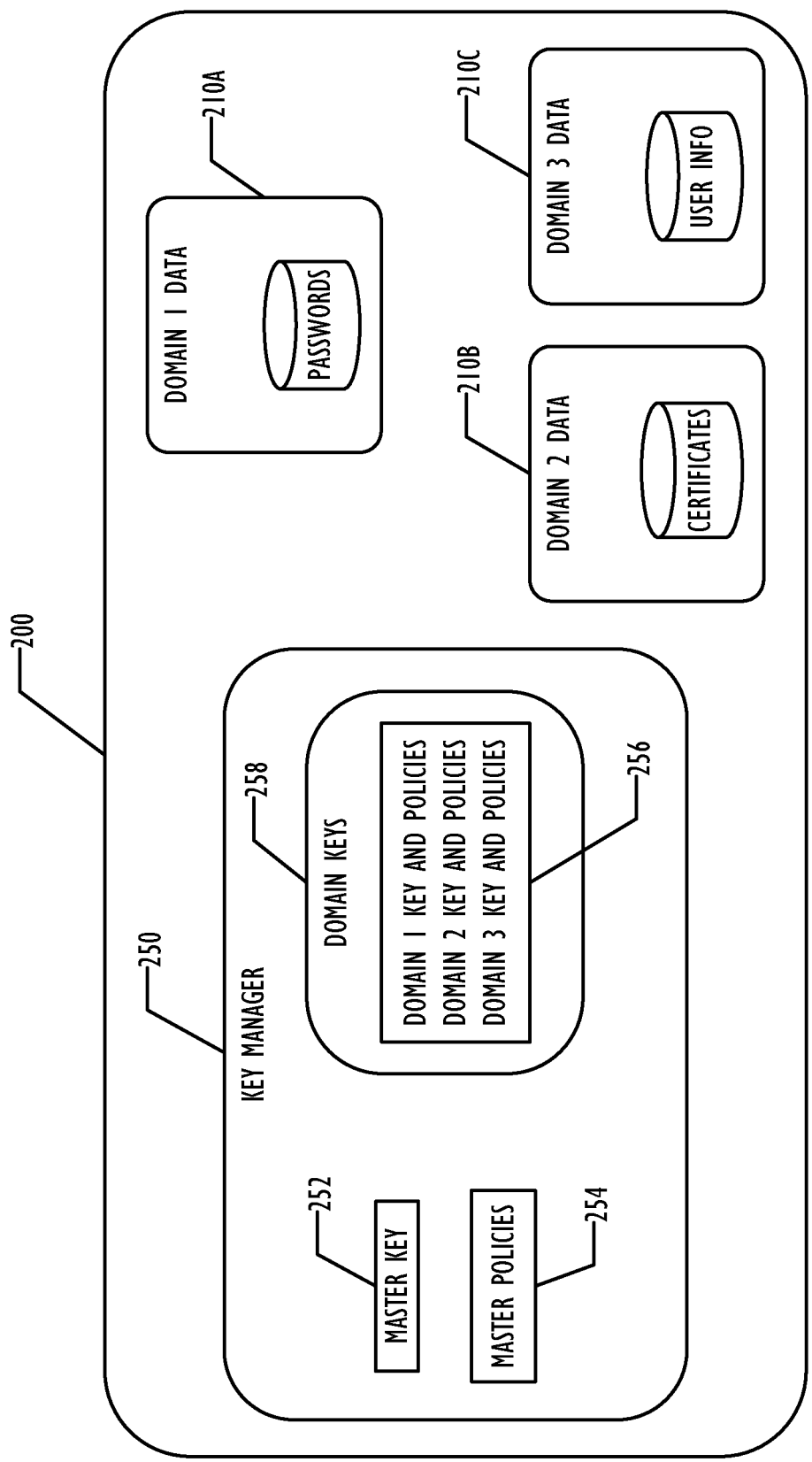
FIG. 2 illustrates, in block diagram form, an embodiment of a technique for managing keys with a key manager separate from the application domains.

FIG. 2 is a block diagram illustrating one embodiment using a Key Manager system for separating out key storage, policies, and management from application domains. An application 200, similar to the application 100 of FIG. 1 has three domains 210, each of which have a need for encryption of passwords, certificates, or user information. Unlike the prior art application, where each domain 110, 120, and 130 managed their own keys and policies, a Key Manager 250 provides those services to the three domains 210. The Key Manager 250 manages a master key 252, a master policy 254, and domain keys 256.

The Master Key 252 is a cryptographically strong key that is used to protect all of the domain keys that are stored in the Key manager system. The Master Policies 254 may be used by the Key Manager 250 to ensure that the Master Key 252 is acceptable. Domain Keys 256 are used to encrypt the domain specific data. These keys may be chosen for the specific requirements of the domain and are typically independent from one another.

Separating out the storage of the keys from the domain specific area may provide numerous advantages, including (a) secure storage and retrieval of domain keys; (b) ensuring that approved encryption algorithms are used; (c) ensuring that keys meet policy requirements; (d) allowing a master encryption algorithm and key length to be independent of the domains; (e) allowing domain encryption algorithms and key lengths to be independent of each other; (f) allowing the master key to be cycled independently of domain keys; (g) allowing domain keys to be cycled independently of each other; (h) preventing the domain from accessing the key directly; (i) allowing key lifetimes to be set and managed; (j) allowing multiple versions of domain keys to be maintained and retrieved; (k) allowing key version lifetimes to be set and managed; (l) allowing domain data to be migrated over time using versioned keys; (m) allowing the master key to be provided from variety of different sources; and (n) allowing key policies to be dynamically changed and enforced at runtime.

By encapsulating all cryptography services into objects that perform these operations, the domain areas may be kept independent of the specifics of the algorithms, while ensuring that security requirements are met. In one embodiment, the domain never has direct access to the key, thus the domain cannot inadvertently expose the application and its data to security risks.

Various embodiments addresses these different requirements by creating a common abstraction layer through a set of objects which may provide some or all of these features while enforcing any required policies.

The following definitions are provided for purposes of this description.

"Cipher" means an encryption algorithm used to transform plaintext (unencrypted data) into ciphertext (encrypted data) and vice-versa. A cipher is stronger than another cipher if it makes determining the plaintext from the ciphertext without the key more difficult. Symmetric key algorithms use the same key to convert from plaintext to ciphertext (i.e., encryption) and to convert from ciphertext to plaintext (i.e., decryption). Asymmetric key algorithms use a different key to encrypt data than to decrypt the data. One example of asymmetric key encryption is the RSA® Public Key encryption technique. ("RSA" is a registered trademark of EMC Corporation.) "Cipher" also means the class and instances of objects that perform cryptography services using the encryption algorithm.

"Key" means a secret value that is used by the encryption algorithm to protect the data. The cipher uses the key as input to the algorithm to convert the plaintext to ciphertext during encryption or to convert the ciphertext to plaintext during decryption.

"Encryption" means the process of protecting data by converting plaintext to ciphertext using an algorithm and an encryption key.

"Decryption" means the process of converting protected ciphertext to plaintext using an algorithm and a decryption key.

"Policy" means a requirement or set of requirements that may be enforced for the system.

"Domain" means the part of an application that requires cryptography services. Each domain provides functionality to the overall application, but may have requirements that are independent of the other parts of the application. A domain may also be referred to as a component or module. Different domains of an application may use different cryptography services and techniques as convenient or desired.

In one embodiment, all of the cryptography services provided by the Key Manager 250 may be encapsulated within two classes. These two classes are the Key Manager and the Cipher classes.

In one embodiment, an instance of the Key Manager class may be responsible for enforcing all of the policies related to the cryptography services. For example, it may ensure that only allowable encryption algorithms, key lengths, key values, and lifetimes are used by the instances of the Cipher class. All keys may be stored and retrieved by the Key Manager 250. The Key Manager 250 may encrypt the domain keys 256 using the master key 252, storing the domain keys in a key store. Because all of the keys that protect the application and data are protected by encryption using the master key 252, the master key 252 and the encryption technique used with the master key 252 should be cryptographically strong, at least as strong as the strongest of the domain keys 256 and the encryption algorithms used with the domain keys 256. The performance of the master key algorithm in some embodiments may be as or more important than its cryptographic strength.

Figure 3:
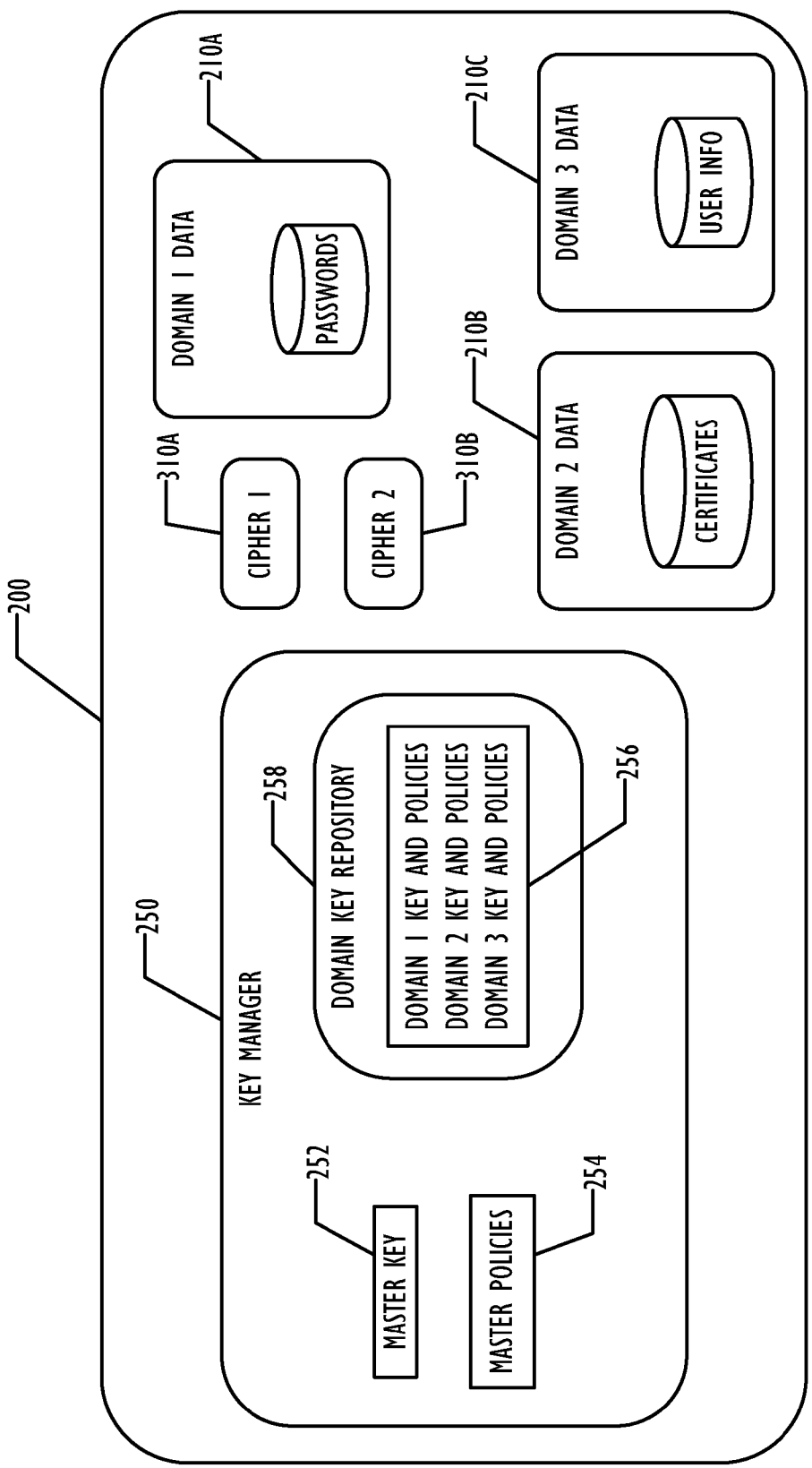
FIG. 3 illustrates, in block diagram form, the embodiment of FIG. 2 further illustrating cipher objects for use by the application domains.

FIG. 3 illustrates the embodiment of FIG. 2 with two Cipher objects 310 that have been made available by the Key Manager 250 for use by domains 210.

In one embodiment, the Cipher objects 310 encapsulate the encryption algorithm along with the specific key for a specific domain, allowing the objects to support both encryption and decryption of the domain data, without exposing the algorithm or key to the domain 210.

The application domains 210 are responsible for retrieving their Ciphers 310 from the Key Manager 250 and for using the Ciphers 310 to encrypt or decrypt the data when necessary. Multiple domains may share Cipher objects or may each have their own Cipher object, according to the domain policies managed by the Key Manager 250. The domains 210 in one embodiment do not have access to their respective domain keys 256 or the encryption algorithm other than by invocation of encryption or decryption methods provided by the Cipher objects 310.

Various embodiments of the Key Manager 250 may be provided the master key 252 through different techniques, including (a) user entry; (b) an operating system file; (c) a Public Key Cryptography Standard (PKCS) #12 file; (d) a hardware cryptographic module; (e) a database, or (f) integration with a third party key repository such as the RSA Key Manager from EMC Corporation. In one embodiment, the master key 252 may be stored in a keystore, using any of the technique described above, encrypted by a public key associated with the Key Manager 250. In a further embodiment, a private key corresponding to the public key may be provided to the Key Manager 250 upon startup of the Key Manager 250 for use in decrypting the master key 252.

The Key Manager 250 may store the encrypted domain keys 256 in a key store of any convenient or desired type, including (a) an operating system file, (b) a PKCS #12 file, (c) a database, or (d) a third party key repository. In one embodiment, different key stores or key repositories may be used for different domains. In another embodiment, such as illustrated in FIGS. 2 and 3, multiple domains may have their domain keys 256 stored in a single key repository 258.

In one embodiment, Cipher creation may be performed by requesting the Key Manager 250 to create a new Cipher 310 with specific requirements. The Key Manager 250 may determine an appropriate encryption algorithm and key size given the system wide and domain specific requirements. It may then generate the key 256, encrypt the key 256 using the master key, and store the encrypted key 256 in the repository 258 associated with the domain 210. After storing the key 256 in the repository 258, a Cipher object 310 may be created and returned to the domain 210 for the domain's use in encrypting its data. Even during the creation process, the domain never has access to the key. It is generated by the Key Manager 250.

Key cycling is a technique that replaces an existing key 256 with a new key 256. Some policies may require that a key be used for no more than a certain amount of time before being replaced. In one embodiment, the Key Manager 250 may cycle its master key 252 on demand. All that is required is for it to decrypt all of the domain keys with the old master key 252 and then encrypt the domain keys 256 with the new master key 252 and restore the re-encrypted domain keys 256 in the key store 258. No participation is required by the domains 210 and the domain data does not need to be re-encrypted.

Cipher retrieval is done by requesting the Key Manager 250 for a Cipher object 310 for a specific domain 210. The Key Manager 250 looks for it in the key repository 258 and retrieves the key 256 along with the associated information. The domain key 256 is checked against the current set of policies for the system and the domain 210 and if the domain key 256 still meets the requirements, then a Cipher object 310 is created which encapsulates the domain key 256 and algorithm. The domain 210 may then use this Cipher object 310 to encrypt or decrypt its data.

If the key no longer meets the requirements, the domain 210 may be notified that it needs to cycle its domain key 256. The domain 210 may then ask the Key Manager 250 for a Cycle Cipher. A domain may also explicitly ask to cycle its key by asking for a Cycle Cipher. When the Key Manager 250 creates the Cycle Cipher, it may generate a new key 256 that meets all current policy requirements, including possibly for an entirely new encryption algorithm. The Key Manager 250 may create this Cycle Cipher with the old key 256, which may be used to decrypt the existing data using the existing algorithm, and the new key 256, which may be used for encrypting the data with the new algorithm. At this point, the domain may re-encrypt all of its data. The domain 210 may not directly access the keys 256 used by the Cycle Cipher objects 310. One domain may cycle its domain key 256 without affecting the other domains 210 or their data.

The domains 210 may also ask to cycle their key 256 and maintain the old key 256. If this is allowed by the policy, the Key Manager 250 may create the new key 256 and keep the previous version of the key 256. This allows the domain 210 to re-encrypt only a portion of its data at a time, or only new data. This flexibility may be useful when the key lifetime expires at an inconvenient time and the policy for that domain allows it to schedule the re-encryption of the data at a later time. In one embodiment, if the policy allows, a domain 210 may have different pieces of data encrypted with different versions of the key 256. In such an embodiment, the Key Manager 250 may allow the past versions of the keys 256 to be retrieved and associated with the Cipher object 310. The Cipher object 310 in such an embodiment may take an optional key version when decrypting. Although typically the version is stored as a version number, incremented for each new version, the version data may be stored using desired sequence of values.

In one embodiment, the following classes may be available to application domains. The classes and method described below are illustrative and by way of example only, and other classes and methods may be provided as desired.

The Policy class is used to define a set of requirements that will be enforced when requesting a Cipher 310 from the Key Manager 250. The Policy class may provide methods for use by domains, including the following:

setKeyLifeTime(Duration)—Takes a duration that defines the amount of time before a key will expire.

setMaxVersions(NumberOfVersions)—Takes an integer that determines how many versions of a key 256 may be usable at a time. By default, only 1 version may be used at a time. In one embodiment, a special value, for example 0, may indicate that there is no upper limit; however, this is not recommended for both security and storage reasons. If more than one is allowed, then existing data will not need to be rekeyed immediately when the key 256 expires. New data will be encrypted with the new key 256, but existing data may stay encrypted with the old key 256. The existing data may be rekeyed with the new key 256 when it is rewritten or at some other convenient time.

setAlgorithm(name, keyLength)—Sets the name of an allowed algorithm and the length of a key 256 that is allowed. In one embodiment, the same algorithm may be specified multiple times with different key lengths. In one embodiment, if a special value, for example 0, is used for keyLength, then all key lengths may be allowed.

removeAlgorithm(name, keyLength)—Removes the algorithm name and key length from the algorithms that are allowed under this policy.

getAlgorithms( )—Returns a list of the algorithms and key lengths that are allowed by this policy. The Cipher objects 310 may select any of the list of algorithms, and perform cryptography services using the selected algorithm, without providing any information about the cryptography services or the selected algorithm to the domain that calls the Cipher object 310 to obtain cryptography services.

The Key Manager class may manage the overall protection of the keys with Policies and Cipher objects. The Key Manager class may provide the methods for use by domains, including the following:

setMasterKey(key)—Sets the master key that is used by the Key Manager 250 to protect all of the keys 256 that are under its control. The Master Key 252 must be protected to ensure that all other keys 256 are protected.

rekeyKeyManager(oldKey, newKey)—Modifies the master key 252 that is used by the Key Manager 250 that is used to protect all of the keys. In one embodiment, this method may cause the Key Manager 250 to decrypt each key 256 that is stored with the oldKey, encrypt the domain key 256 with the newKey 252, and store the re-encrypted domain key 256 in the keystore 258. In one embodiment, rekeying may be performed at regular intervals to ensure the protection of all of the domain keys 256.

createDomain(domainName)—Creates a new domain 210 that may have its own set of policies and set of encryption keys 256.

removeDomain(domainName)—Removes a domain.

createPolicy(policyName)—Creates and returns a named policy object which can be used to manage the policies.

deletePolicy(policyName)—Deletes the named policy. If any domains are currently using this policy, then in one embodiment a PolicyInUse exception may be thrown. If this occurs, then the policy should be changed for those domains before deleting the policy.

setPolicy(domainName, policyName)—sets the name policy to be used for the specific domain. If Null is passed in for the policyName, then no policy will be associated with the domain. In one embodiment, each domain may have only one policy associated with it.

createCipher(domainName, cipherName)—creates and returns a named Cipher 310 for the specified domain. The Cipher 310 will be created with an algorithm and key length that adhere to the policies that have been specified for the domain deleteCipher(domainName, cipherName)—deletes the named cipher 310 for the specified domain 210. This should only be performed if the domain 210 is sure that it will no longer need to use the cipher 310 to decrypt any existing data.

getCipher(domainName, cipherName)—retrieves the named cipher 310 for the specified domain 210. If the key lifetime has expired for the cipher 310 or no longer conforms to the current policies for that domain, then a KeyLifeExpired exception will be thrown. This means that a new key 256 has been generated for the specified cipher and that unless versioning is allowed for the data, the existing data will need to be re-encrypted with the new key.

getReKeyCipher(domainName, cipherName)—retrieves a RekeyCipher for the specified domain name and cipher name. A RekeyCipher is used when existing data is keyed with a key 256 that has expired or no longer conforms to the current policies for that domain, thus must be encrypted with the new key 256. The RekeyCipher will contain a cipher 310 and key 256 to be used to encrypt the data and it will contain one or more decryption cipher 310 and key 256 pairs for decrypting existing data.

The Cipher class encapsulates the encryption functionality and domain key 256 for use by domains 210. The Cipher class provides the following methods:

encryptData(data, length)—encrypts and returns the data using the algorithm and key 256 contained within the Cipher 310.

decryptData(data, length)—decrypts and returns the data using the algorithm and key 256 contained within the Cipher 310.

getKeyVersion( )—returns the current version of the key for the cipher 310.

The ReKeyCipher class is an extension of the Cipher class that encapsulates the ability to decrypt data that has been encrypted with the expired key 256 and re-encrypt the data with a new encryption key 256 and/or algorithm. The RekeyCipher object may contain two Ciphers 310 within it: one that is used to decrypt old data and one that is used to encrypt new data. If the encryption Cipher 310 supports versioning, then the decryption Cipher 310 must also. The ReKeyCipher class may provide the following methods:

encryptData(data, length)—Encrypts and returns the data using the new algorithm and/or key 256 contained within the ReKeyCipher object. This method calls the internal encryption Cipher 310 to encrypt the data with the new key/algorithm.

decryptData(data, length)—Decrypts and returns the data using the expired algorithm and/or key 256 contained within the ReKeyCipher object. This method calls the internal decryption Cipher 310 to decrypt the data with the old key/algorithm.

decryptData(data, length, version)—Decrypts and returns the data using the specified version of the algorithm and/or key 256 contained within the Cipher. This method calls the internal MultiVersionCipher object to decrypt the data with one of the older key/algorithm pairs.

The MultiVersionCipher class is an extension of the Cipher class that encapsulates the ability to decrypt data that has been encrypted with one or more expired keys 256 and/or algorithms and re-encrypt it with the latest encryption key 256 and/or algorithm. The MultiVersionCipher may allow a domain 210 flexibility as to when it will rekey its encrypted data. The MultiVersionCipher may be implemented in one embodiment by maintaining a list of Cipher objects 310, one for each version of the Cipher 310. The MultiVersionCipher class may provide the following methods:

encryptData(data, length)—Encrypts and returns the data using the new algorithm and/or key 256 contained within the MultiVersionCipher object. This method calls the latest version of the Cipher 310 to encrypt the data.

decryptData(data, length, version)—Decrypts and returns the data using the specified version of the algorithm and/or key 256 contained within the MultiVersionCipher object. This method finds the appropriate version of the Cipher 310 in the list and then calls it to decrypt the data.

When the components for the application are not within a single process environment, the distribution of the Ciphers 310 must be secure. In one embodiment, each domain may register a public key with the Key Manager 250. This public key may be used whenever the Key Manager 250 returns any object or data to the domain 210. The domain 210 may then decrypt the data and objects returned from the key manager using the domain 210's own private key which only it will have.

Figure 4:
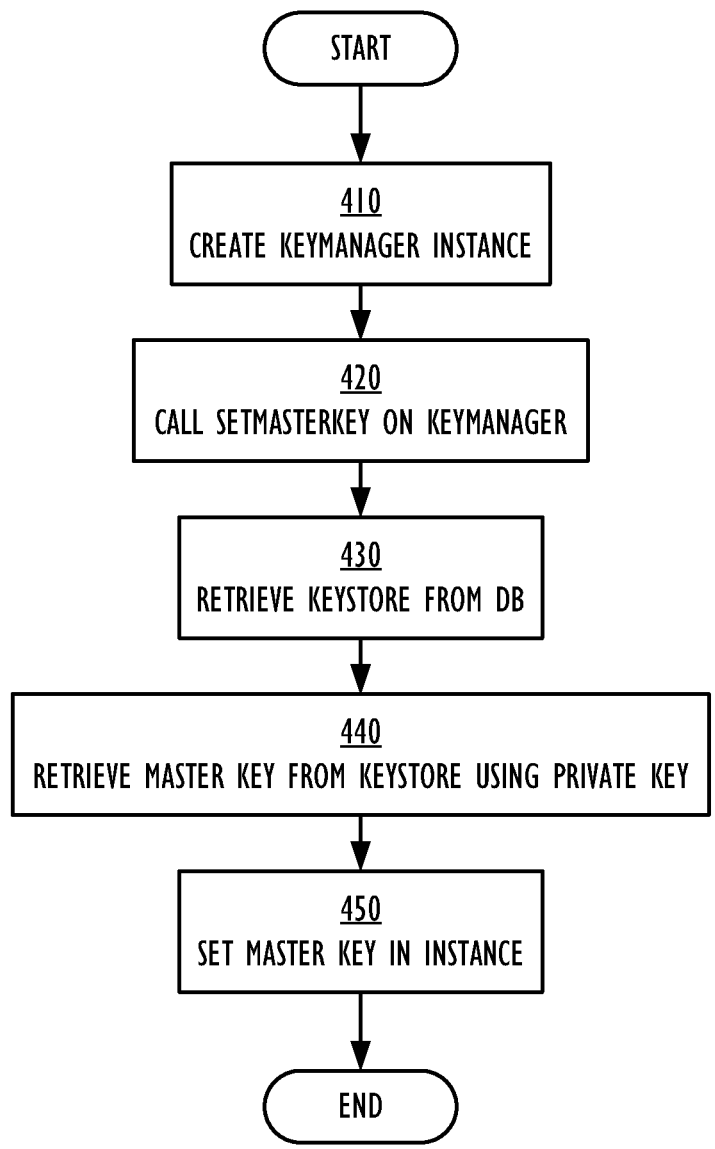
FIG. 4 illustrates, in flowchart form, a technique for creating a key manager according to one embodiment.

FIG. 4 is a flowchart illustrating a technique for initialization of the Key Manager 250 according to one embodiment. In block 410, the Key Manager instance 250 may be created. In block 420, the setMasterKey method of the Key Manager 250 may be called. In one embodiment, the key repository or key store 258 is stored in a database. In block 430, the setMasterKey method may retrieve the key store from the database, then in block 440, the setMasterKey method may retrieve the Master key 252 for the Key Manager 250 from the key repository 258 using a private key that may be supplied to the Key Manager 250 upon invocation. The Master key 252 may then be set in the Key Manager instance 250 in block 450.

Figure 5:
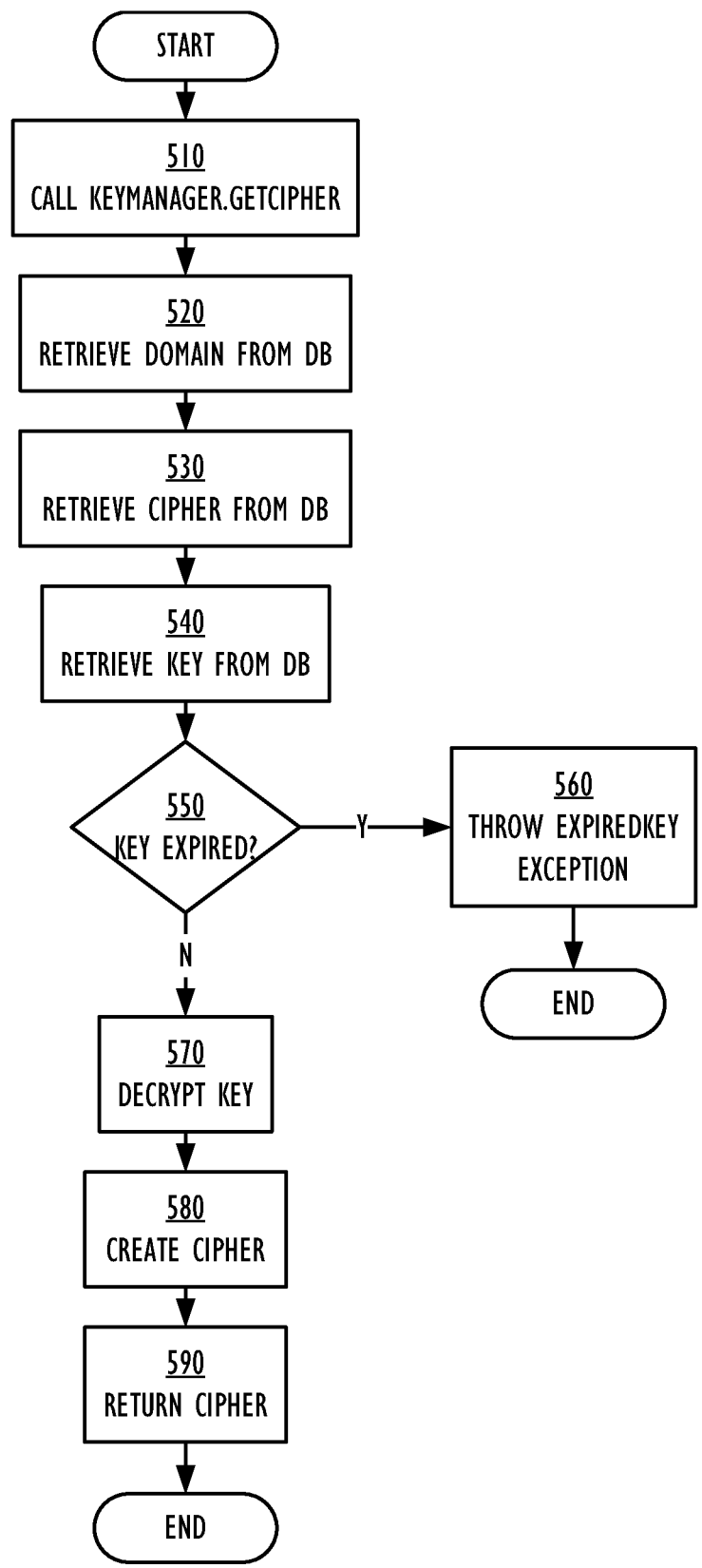
FIG. 5 illustrates, in flowchart form, a technique for retrieving a cipher object for use by a domain according to one embodiment.

FIG. 5 is a flowchart illustrating a technique for retrieving a cipher from the Key Manager 250 for use by a domain 210 according to one embodiment. In block 510, the domain 210 may call the KeyManager.getCipher method, passing in the name of the domain 210. In block 520, the Key Manager 250 may retrieve Domain information from the database. In block 530, the Key Manager 250 may retrieve Cipher information (such as algorithm and key length) from the database. In block 540, the Key Manager 250 may retrieve the domain 210's domain key 256 from the database. The Key Manager 250 may check whether the key 256 has expired in block 550, and if it is expired or no longer conforms to the current policies for the domain, throw an ExpiredKey exception in block 560. If not expired, then in block 570 the Key Manager 250 may decrypt the domain key 256 using the master key 252 of the Key Manager 250. In block 580, the Key Manager 250 may create a Cipher object 310 with the algorithm and key previously retrieved. Finally, in block 590, the Key Manager 250 returns the created Cipher object 310.

Where a multi-versioned cipher is used, the technique described above may be repeated to retrieve all valid versions of the algorithm and key pairs, allowing use of any desired version of the cipher by the domain 210.

Figure 6:
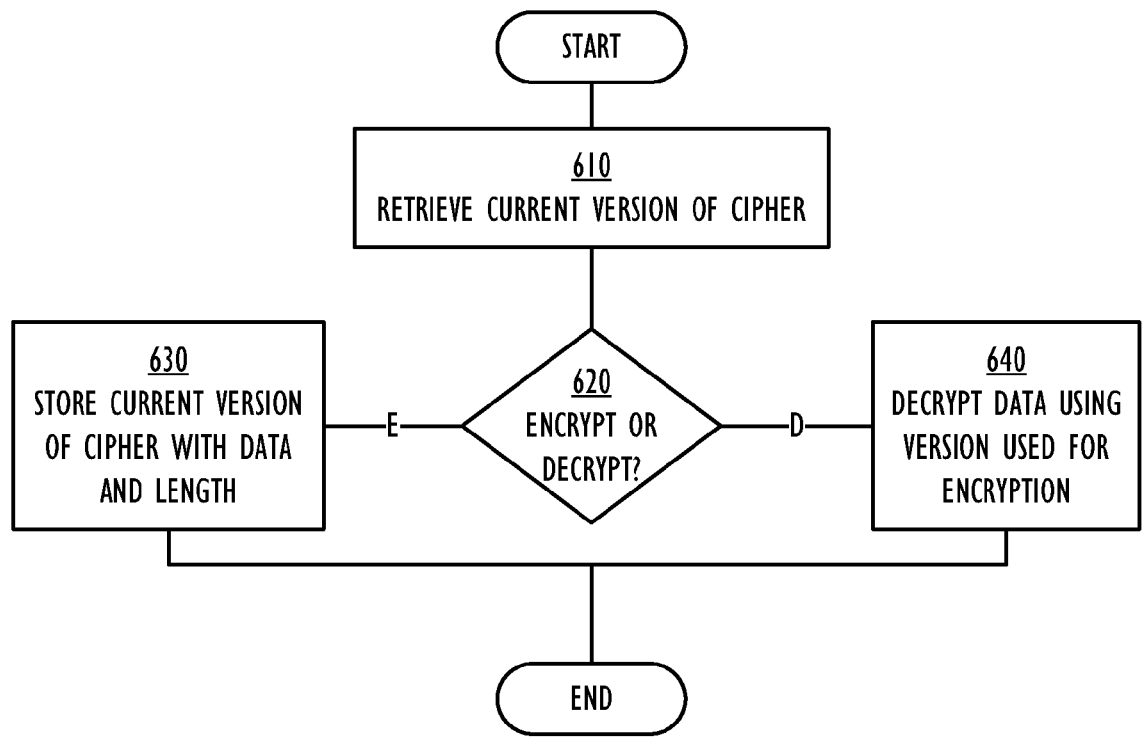
FIG. 6 illustrates, in flowchart form, a technique for using a versioned cipher object according to one embodiment.

FIG. 6 is a flowchart illustrating a technique for using a versioned Cipher 310 according to one embodiment. In this technique, the Domain 210 retrieves a Cipher object 310 as in the technique illustrated in FIG. 5, but the Cipher object 310 returned is a versioned Cipher 310. In block 610, the domain 210 retrieves the current version of the Cipher 310. By keeping track of which version of the Cipher 310 was used to encrypt data, the domain 210 may incrementally rekey the data and know when all of the data has been rekeyed. In block 620, the domain 210 determines whether it is encrypting or decrypting. If encrypting, then in block 630 the domain 210 may call the encryptData method of the Cipher 310, passing the cleartext data and its length. The domain 210 may also store the current version of the Cipher 310 when storing the encrypted data and length. If decrypting, then in block 640 the domain 210 may call the decryptData method of the Cipher 310, passing in the encrypted data to be decrypted, the length, and the version of the Cipher 310 used to encrypt the data.

Figure 7:
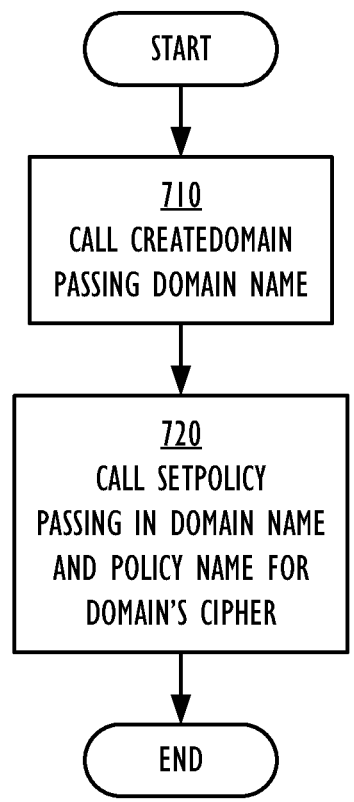
FIG. 7 illustrates, in flowchart form, a technique for creating a domain object according to one embodiment.

FIG. 7 is a flowchart illustrating a technique for creating a domain 210 according to one embodiment. In block 710, the application 200 may call the KeyManager.createDomain method, passing in the domain name. In one embodiment, the createDomain method may generate a domain name and return it to the application 200, instead of receiving the name. In block 720, the application 200 may call the KeyManager.setPolicy method, passing in the domain name and the policy name of the policy that the application 200 wants to have enforced for this domain's cipher 310.

Figure 8:
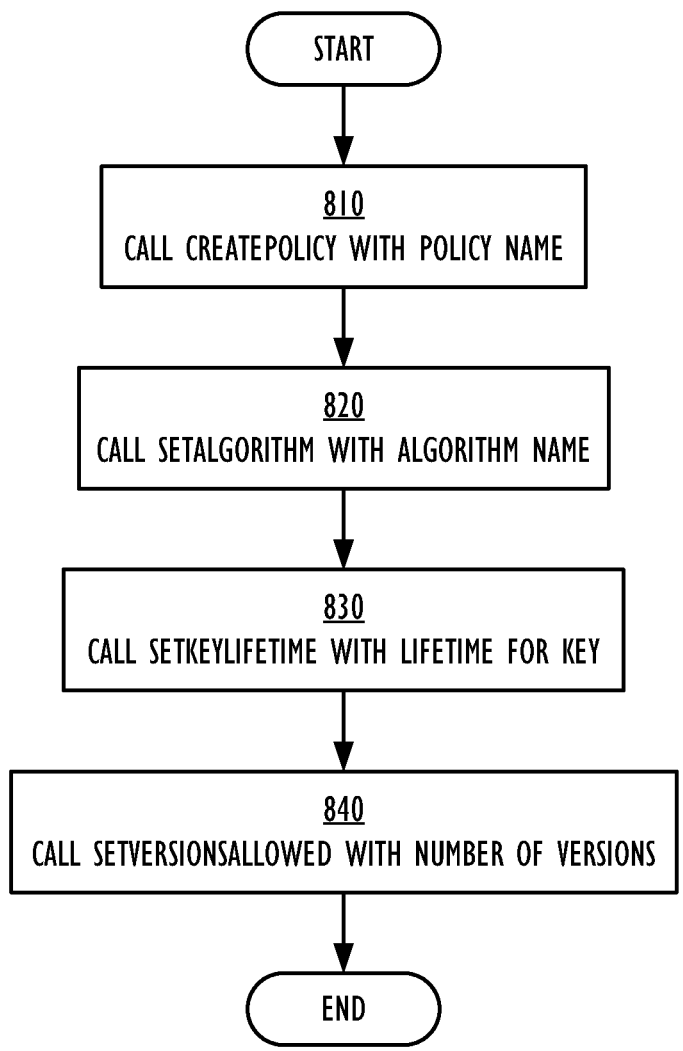
FIG. 8 illustrates, in flowchart form, a technique for creating a policy object according to one embodiment.

FIG. 8 is a flowchart illustrating a technique for creating a policy according to one embodiment. In block 810, the application 200 may call the KeyManager.createPolicy method with the policy name. In one embodiment, the createPolicy method may generate a policy name and return it to the application 200, instead of receiving the name. In block 820, the Policy.setAlgorithm method may be called with the algorithm name to be established for that policy object. In block 830, the Policy.setKeyLifetime method may be called with the allowed lifetime for keys according to that Policy object. In block 840, the Policy.setVersionsAllowed method may be called to set the number of versions of keys that can be maintained for any Ciphers 310 created under this policy.

In one embodiment, all of the persistent cryptographic data may be stored in a database. In a further embodiment, the database may employ several different tables for storing the related data: (a) a Policy table, (b) a Domain table, (c) a PolicyDomain table, (d) a Key table, (e) a KeyStore table, (f) a KeyStoreData table, and (g) a KeyStoreDataElement table. These tables are illustrative and by way of example only, and other tables and table names may be used. In addition, other techniques for storing cryptographic data may be used than using a database.

The Policy table may contain information on a set of policies. In one embodiment, the Policy table may include the following columns:

Name—The name of the policy. In one embodiment, this column is the primary key for the table.

Algorithm—The name of an algorithm that is valid for this policy.

KeyLength—The length of a key 256 that may be used for this policy.

KeyLifetime—The lifetime of a key 256, after which a new key 256 must be created for encrypting data.

VersionsAllowed—How many versions of keys 256 may be kept. In one embodiment, a 0 value indicates that an unlimited number of keys 256 may be kept.

The Domain table may contain a set of domains 210. In one embodiment, the Domain table may include the following columns:

Name—The name of the domain 210. In one embodiment, this column is the primary key for the table.

PublicKey—The public key of the domain 210. This is used when returning any values about the domain 210 in an environment that is not within a secure environment such as a single process.

The PolicyDomain table may contain a set of valid policies for each domain 210. In one embodiment, the PolicyDomain table may include the following columns:

PolicyName—The name of the policy.

DomainName—The name of the domain.

In one embodiment, the primary key for the PolicyDomain table is the combination of PolicyName and DomainName.

The Cipher table may contain a set of cipher information for each domain 210. In one embodiment, the Cipher table may include the following columns:

DomainName—The name of the domain 210.

CipherName—The name of this cipher 310.

PolicyName—The name of the policy for this cipher 310.

Algorithm—The name of the algorithm for this cipher 310.

KeyId—The ID of the encrypted key for this cipher 310 in the Keys table. This key is encrypted with the master key for the Key Manager 250.

CurrentVersion—The most recent version of the key for this cipher 310.

ActiveVersions—The number of keys that are maintained for this cipher 310.

In one embodiment, the primary key for the Cipher table is the combination of the domain name and the cipher name.

The Keys table may contain a set of key values. In one embodiment, these key values may be encrypted using the master key 252. In one embodiment, the Keys table may include the following columns:

KeyId—A unique id associated with a Cipher. In one embodiment, the KeyId is the primary key for the Keys table.

KeyDataID—The key itself.

KeyVersion—The version of this key.

TotalLength—The length of this key.

The KeyStore table may be used to store the key store 258 that contains the master key 252 for the key manager 250. In one embodiment, the KeyStore table may include the following columns:

KeyStoreName—The name of the key store 258. In one embodiment, this is the primary key for the KeyStore table.

KeyStoreLength—The length of all of the key store data.

The KeyStoreData table may associate a KeyStore 258 with its data elements. In one embodiment, the KeyStoreData table may include the following columns:

KeyStoreName—The name of the KeyStore 258.

KeyStoreDataElementId—The id of a row of data in the KeyStoreDataElement table which is part of this KeyStore.

DataElementOrder—The order of this piece of data in the overall list of data elements for this key store.

In one embodiment, the primary key for the KeyStoreData table may be the KeyStoreName and the KeyStoreDataElementId.

The KeyStoreDataElement table may be used to store part of the KeyStore data. In one embodiment, the KeyStoreDataElement table may include the following columns:

DataElementId—The unique id for this row of data. In one embodiment, this may be the primary key for the KeyStoreDataElement table.

DataLength—The length of the data in this row.

Data—The raw data for this element.

Figure 9:
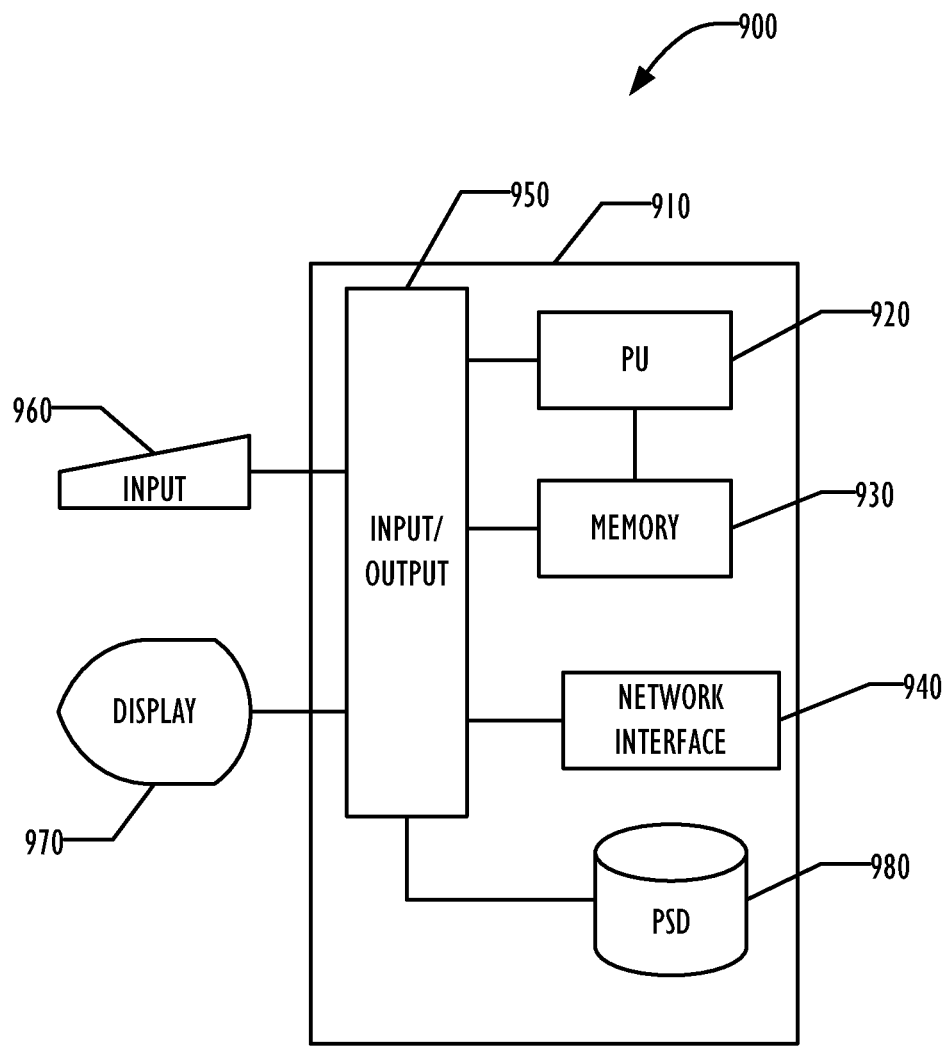
FIG. 9 illustrates, in block diagram form, an example computing device according to one embodiment.

Referring now to FIG. 9, an example computer 900 for use in providing a transparent process context is illustrated in block diagram form. Example computer 900 comprises a system unit 910 which may be optionally connected to an input device 960 (e.g., keyboard, mouse, touch screen, etc.) and display 970. A program storage device (PSD) 980 (sometimes referred to as a hard disc) is included with the system unit 910. Also included with system unit 910 is a network interface 940 for communication via a network with other computing and corporate infrastructure devices (not shown). Network interface 940 may be included within system unit 910 or be external to system unit 910. In either case, system unit 910 will be communicatively coupled to network interface 940. Program storage device 980 represents any form of non-volatile storage including, but not limited to, all forms of optical and magnetic, including solid-state, storage elements, including removable media, and may be included within system unit 910 or be external to system unit 910. Program storage device 980 may be used for storage of software to control system unit 910, data for use by the computer 900, or both.

System unit 910 may be programmed to perform methods in accordance with this disclosure (an example of which are in FIGS. 4-8). System unit 910 comprises a processor unit (PU) 920 input-output (I/O) interface 950 and memory 930 Processing unit 920 may include any programmable controller device including, for example, one or more members of the Intel Atom.RTM., Core.RTM., Pentium.RTM. and Celeron.RTM. processor families from Intel Corporation and the Cortex and ARM processor families from ARM. (INTEL, INTEL ATOM, CORE, PENTIUM, and CELERON are registered trademarks of the Intel Corporation. CORTEX is a registered trademark of the ARM Limited Corporation. ARM is a registered trademark of the ARM Limited Company.) Memory 930 may include one or more memory modules and comprise random access memory (RAM), read only memory (ROM), programmable read only memory (PROM), programmable read-write memory, and solid-state memory. One of ordinary skill in the art will also recognize that PU 920 may also include some internal memory including, for example, cache memory.

Figure 10:
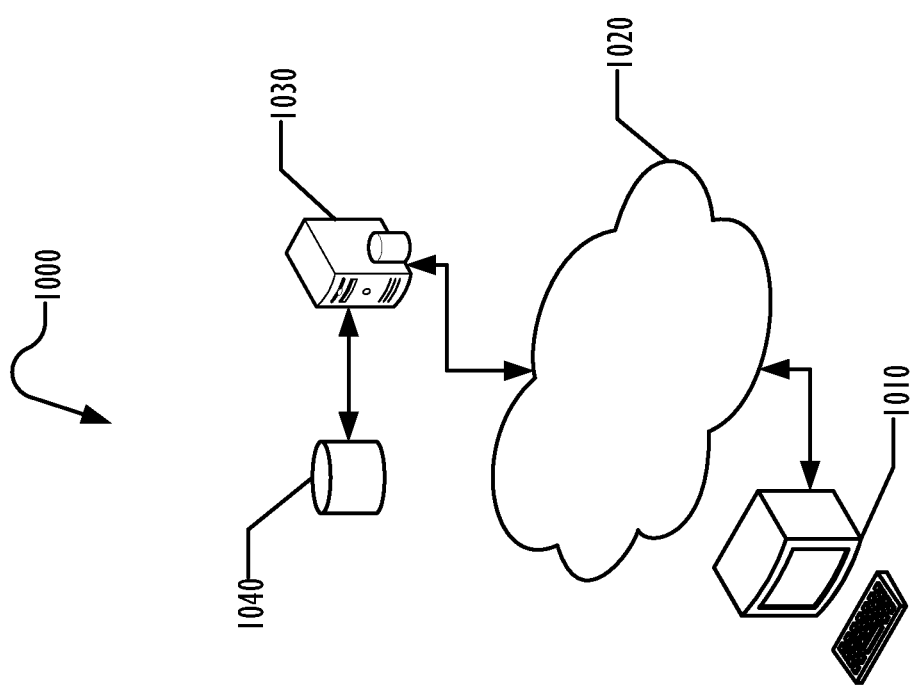
FIG. 10 illustrates, in block diagram form, an example network of computers for performing techniques such as are disclosed herein.

FIG. 10 is a block diagram illustrating a networked system of computers 1000 that implement cryptography services as described above according to one embodiment. A workstation computer 1010 may be connected to a server computer 1030 via a network 1020 or by any using any other technique for computer communications known to the art. A database 1040 associates with the server computer 1030 may store the tables described above. The application 200 may execute on the workstation 1010 or the server 1030 and in one embodiment, part of the application 200 may execute on the workstation 1010 and part on the server 1030. The Key Manager 250 may execute on either the workstation 1010 or the server 1030 as desired. The number of devices shown in FIG. 10 is illustrative and by way of example only, and other devices may be included in the system 1000 and employ the disclosed techniques as desired.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

What is claimed is:

1. A system for centrally managing encryption or decryption services across multiple domains, the system comprising:
   at least one processor;
   a non-transitory computer readable medium including instructions, which, when executed, are configured to cause the at least one processor to implement,
   a key manager configured to generate a master key to protect a plurality of domains including a first domain and a second domain different than the first domain;
   the key manager configured to store the master key;
   the key manager configured to determine a first encryption algorithm and first key size based on domain-specific policy information for the first domain, and determine a second encryption algorithm and second key size based on domain-specific policy information for the second domain;
   the key manager configured to generate a plurality of domain keys including generating a first domain key having the first key size for the first domain, and generating a second domain key having the second key size for the second domain;
   the key manager configured to encrypt the plurality of domain keys including the first domain key and the second domain key with the master key; and
   the key manager configured to store the encrypted first domain key and the encrypted second domain key in an area remote from the first domain and the second domain,
   the key manager configured to generate a first Cipher object for the first domain in response to a request from the first domain, including retrieving the first domain key, decrypting the first domain key with the master key, and transmitting the first Cipher object to the first domain, the first Cipher object identifying the first encryption algorithm and including the first domain key;
   the key manager configured to generate a second Cipher object for the second domain in response to a request from the second domain, including retrieving the second domain key, decrypting the second domain key with the master key, and transmitting the second Cipher object to the second domain, the second Cipher object identifying the second encryption algorithm and including the second domain key,
   wherein the first encryption algorithm and the first domain key of the first Cipher object are not exposed to the first domain other than by invocation of encryption or decryption provided by the first Cipher object, and the second encryption algorithm and the second domain key of the second Cipher object are not exposed to the second domain other than by invocation of encryption or decryption provided by the second Cipher object.

2. The system of claim 1, wherein the first domain is configured to encrypt or decrypt domain data associated with the first domain using the first encryption algorithm and the first domain key, and the second domain is configured to encrypt or decrypt domain data associated with the second domain using the second encryption algorithm and the second domain key.

3. The system of claim 1, wherein the key manager is configured to obtain a private key and retrieve at least one of the first domain key and the second domain key using the private key.

4. The system of claim 1, wherein the first domain relates to a first portion of an application requiring first cryptography services, and the second domain relates to a second portion of the application requiring second cryptography services.

5. The system of claim 1, wherein the first domain includes a set of classes whose instances are granted from a first set of permissions, and the second domain includes a set of classes whose instances are granted from a second set of permissions.

6. The system of claim 1, wherein the master key is equal to or stronger than the plurality of domain keys.

7. The system of claim 1, wherein the key manager is further configured to replace the first domain key and the second domain key with new keys including decrypting the first domain key and the second domain key with the master key, generating a new master key, re-encrypting the first domain key and the second domain key with the new master key, and re-storing the re-encrypted first and second domain keys.

8. A method for centrally managing encryption or decryption services across multiple domains, the method comprising:
   generating, using at least one processor, a master key to protect a plurality of domains including a first domain and a second domain different than the first domain;
   storing, using the at least one processor, the master key;
   determining, using the at least one processor, a first encryption algorithm and first key size based on domain-specific policy information for the first domain;
   determining, using the at least one processor, a second encryption algorithm and second key size based on domain-specific policy information for the second domain;
   generating, using the at least one processor, a plurality of domain keys including generating a first domain key having the first key size for the first domain, and generating a second domain key having the second key size for the second domain;
   encrypting, using the at least one processor, the plurality of domain keys including the first domain key and the second domain key with the master key; and
   storing, using the at least one processor, the encrypted first domain key and the encrypted second domain key in an area remote from the first domain and the second domain;
   generating, using the at least one processor, a first Cipher object for the first domain in response to a request from the first domain, including retrieving the first domain key, decrypting the first domain key with the master key, and transmitting the first Cipher object to the first domain, the first Cipher object identifying the first encryption algorithm and including the first domain key;
   generating, using the at least one processor, a second Cipher object for the second domain in response to a request from the second domain, including retrieving the second domain key, decrypting the second domain key with the master key, and transmitting the second Cipher object to the second domain, the second Cipher object identifying the second encryption algorithm and including the second domain key, wherein the first encryption algorithm and the first domain key of the first Cipher object are not exposed to the first domain other than by invocation of encryption or decryption provided by the first Cipher object, and the second encryption algorithm and the second domain key of the second Cipher object are not exposed to the second domain other than by invocation of encryption or decryption provided by the second Cipher object.

9. The method of claim 8, further comprising:

encrypting or decrypting, by the first domain, domain data associated with the first domain using the first encryption algorithm and the first domain key; and encrypting or decrypting, by the second domain, domain data associated with the second domain using the second encryption algorithm and the second domain key.

10. The method of claim 8, further comprising:

obtaining, using the at least one processor, a private key; and retrieving, using the at least one processor, at least one of the first domain key and the second domain key using the private key.

11. The method of claim 8, wherein the first domain relates to a first portion of an application requiring first cryptography services, and the second domain relates to a second portion of the application requiring second cryptography services.

12. The method of claim 8, wherein the first domain includes a set of classes whose instances are granted from a first set of permissions, and the second domain includes a set of classes whose instances are granted from a second set of permissions.

13. The method of claim 8, wherein the master key is equal to or stronger than the plurality of domain keys.

14. The method of claim 8, further comprising:

replacing, including the at least one processor, the first domain key and the second domain key with new keys including decrypting the first domain key and the second domain key with the master key, generating a new master key, re-encrypting the first domain key and the second domain key with the new master key, and re-storing the re-encrypted first and second domain keys.

15. A non-transitory computer-readable medium storing instructions that when executed cause at least one processor to centrally manage encryption or decryption services across multiple domains, the instructions comprising instructions to:

generate a master key to protect a plurality of domains including a domain;

store the master key;

determine an encryption algorithm and key size based on domain-specific policy information for the domain;

generate a domain key having the key size for the domain;

encrypt the domain key with the master key;

store the encrypted domain key in an area remote from the domain; and generate a Cipher object for the domain in response to a request from the domain, including retrieving the domain key, decrypting the domain key with the master key, and transmitting the Cipher object to the domain, the Cipher object identifying the encryption algorithm and including the domain key, wherein the encryption algorithm and the domain key of the Cipher object are not exposed to the domain other than by invocation of encryption or decryption provided by the Cipher object.

16. The non-transitory computer-readable medium of claim 15, further comprising:

encrypt or decrypt, by the domain, domain data associated with the domain using the encryption algorithm and the domain key.

* * * * *